United States Patent [19]
Carlucci

[11] 3,796,269
[45] Mar. 12, 1974

[54] CULTIVATOR

[76] Inventor: James J. Carlucci, 716 Monroe Ave., Los Banos, Calif. 93635

[22] Filed: Feb. 10, 1972

[21] Appl. No.: 225,070

[52] U.S. Cl.................. 172/149, 172/158, 172/177, 172/184
[51] Int. Cl............................................. A01b 49/02
[58] Field of Search.................... 172/143, 145–149, 172/155, 158, 160, 175, 177, 184, 197, 198, 579, 596, 678, 180, 543, 556

[56] References Cited
UNITED STATES PATENTS

| | | | |
|---|---|---|---|
| 3,314,486 | 4/1967 | Remy................................. | 172/543 |
| 1,084,478 | 1/1914 | Peterson........................... | 172/184 X |
| 3,217,813 | 11/1965 | Koemel.............................. | 172/177 |
| 3,082,829 | 3/1963 | Buddingh et al................ | 172/149 X |
| 2,994,387 | 8/1961 | Lehman et al.................. | 172/177 X |
| 129,712 | 7/1872 | Bussell............................ | 172/184 X |

*Primary Examiner*—Stephen C. Pellegrino
*Attorney, Agent, or Firm*—Huebner & Worrel

[57] ABSTRACT

A cultivator for cultivating several crop rows simultaneously having a tool bar supported for earth traversing movement in a predetermined direction of travel; and a plurality of cultivating units individual to the crop rows mounted on the tool bar, each unit having a forwardly disposed mounting shaft mounted on the tool bar, a plurality of disk blades adjustably positionable on each shaft for cultivation on opposite sides of their respective crop row, each unit having rearwardly disposed freely rotatable cultivating wheels oblique to the direction of travel for cultivation in the crop row, a sweep disposed forwardly of the disk blades, and a harrow disposed rearwardly of the cultivating wheels to exert a cooperative effect on the earth along said rows and between plants in the rows.

1 Claim, 16 Drawing Figures

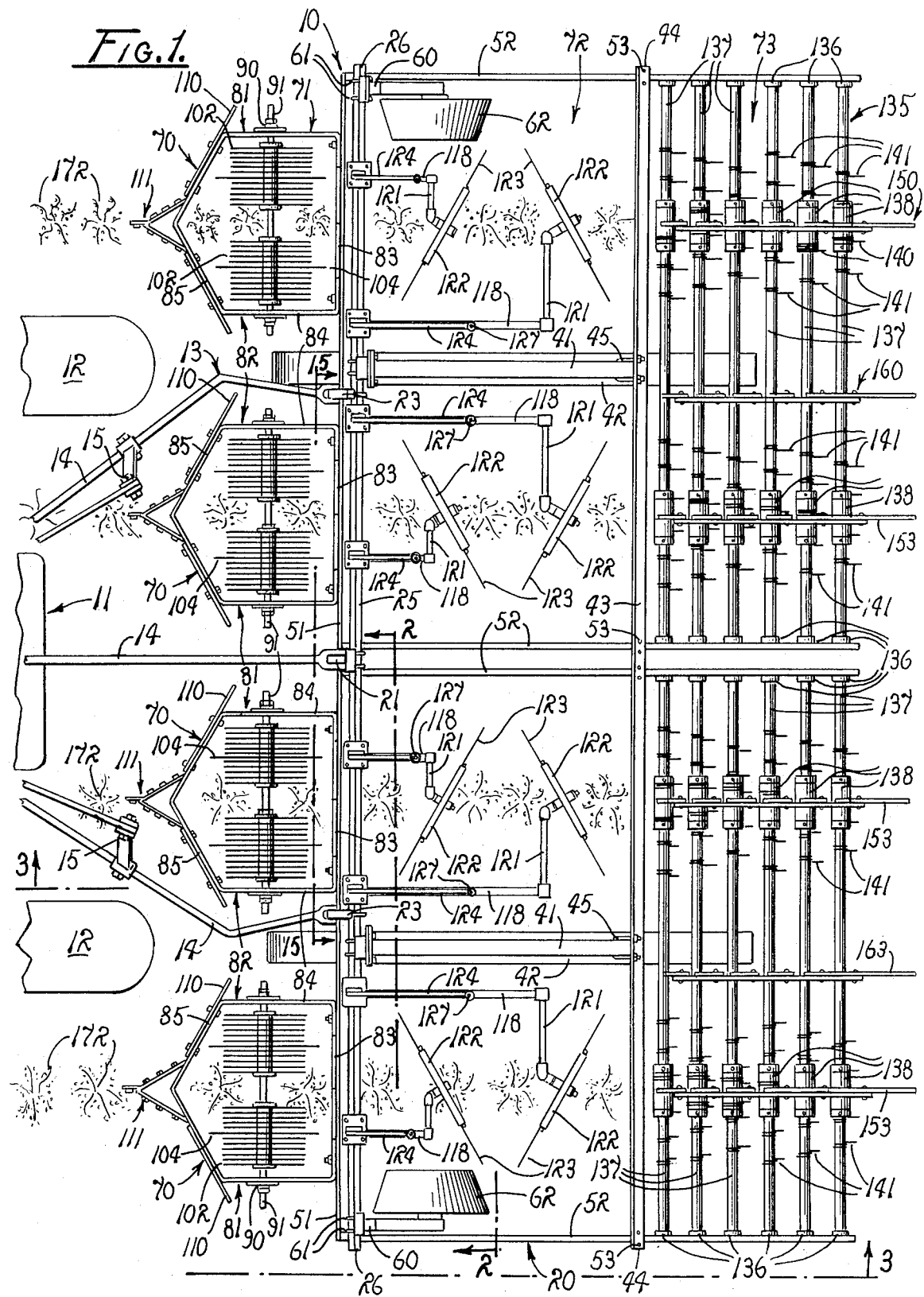

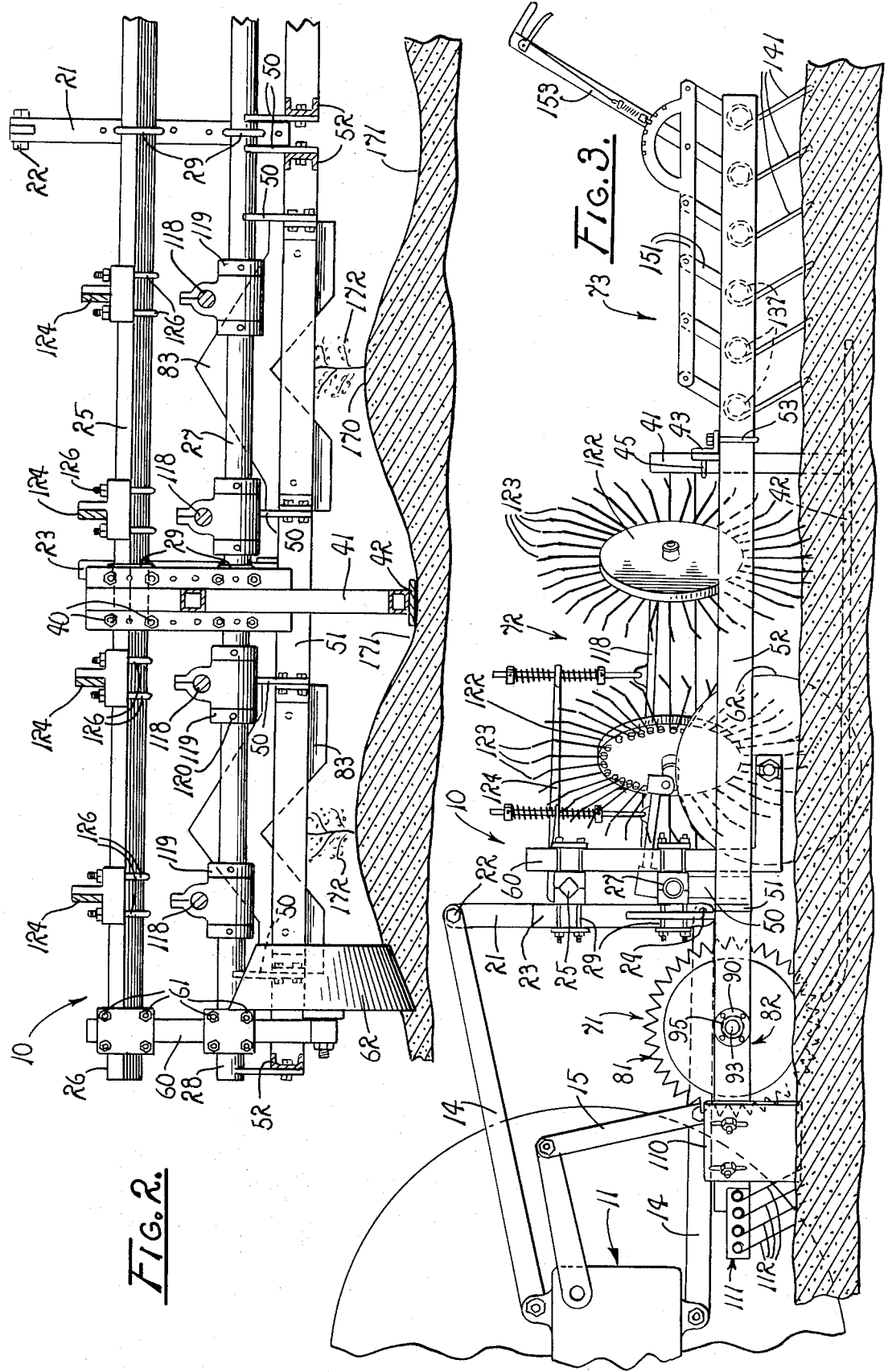

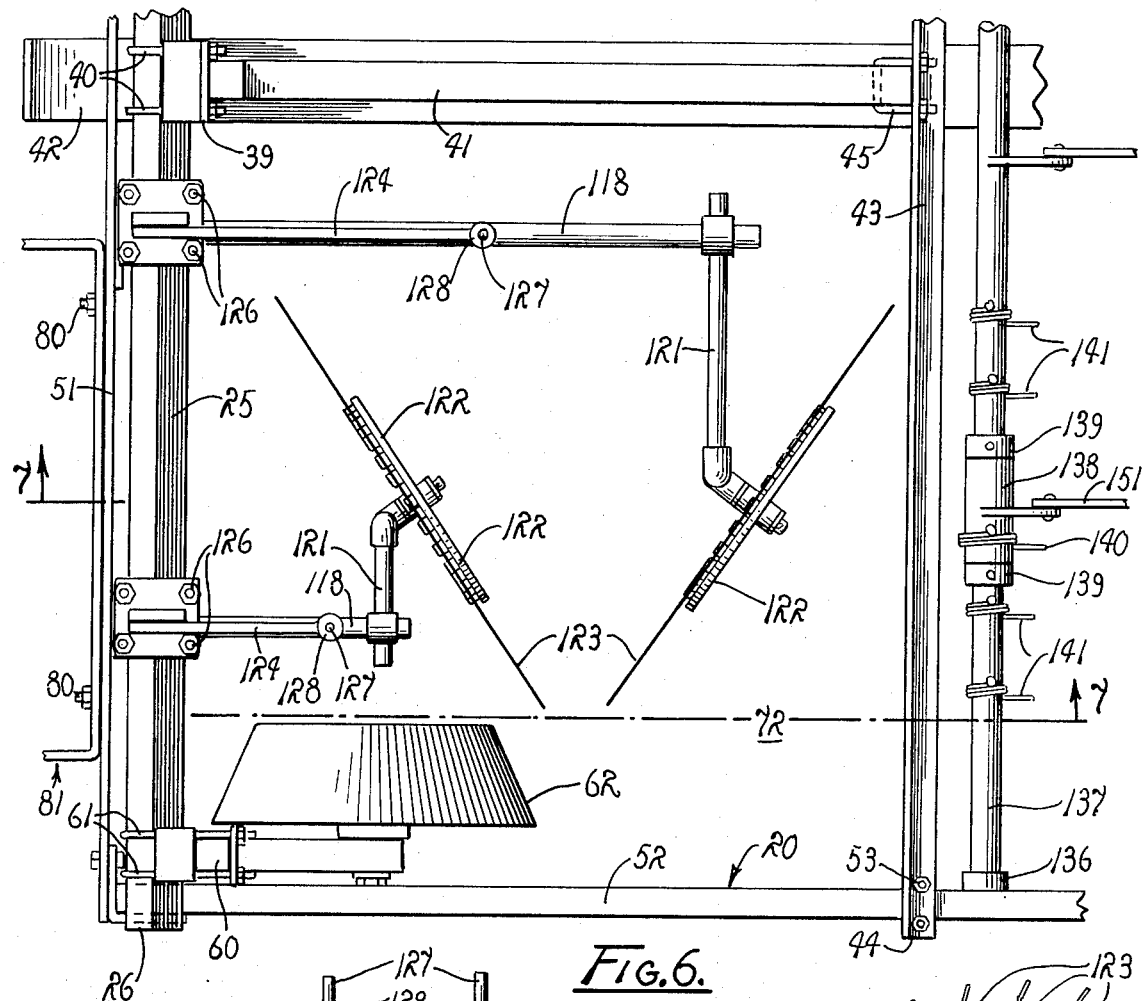
FIG. 6.
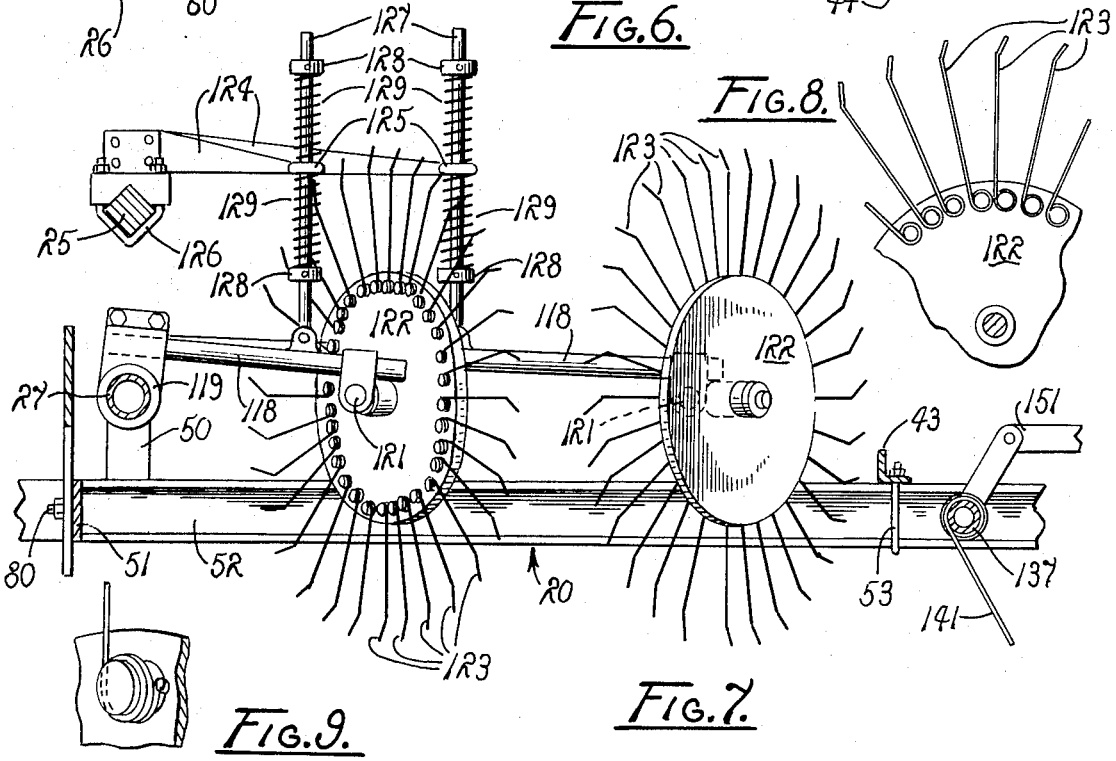
FIG. 8.
FIG. 9.   FIG. 7.

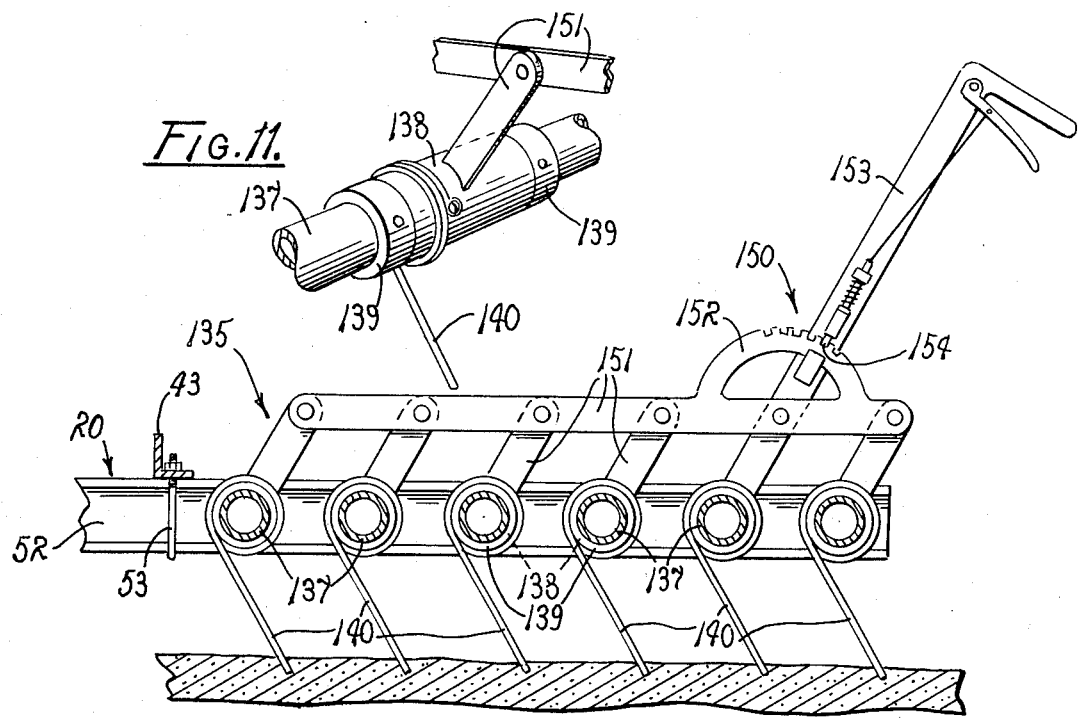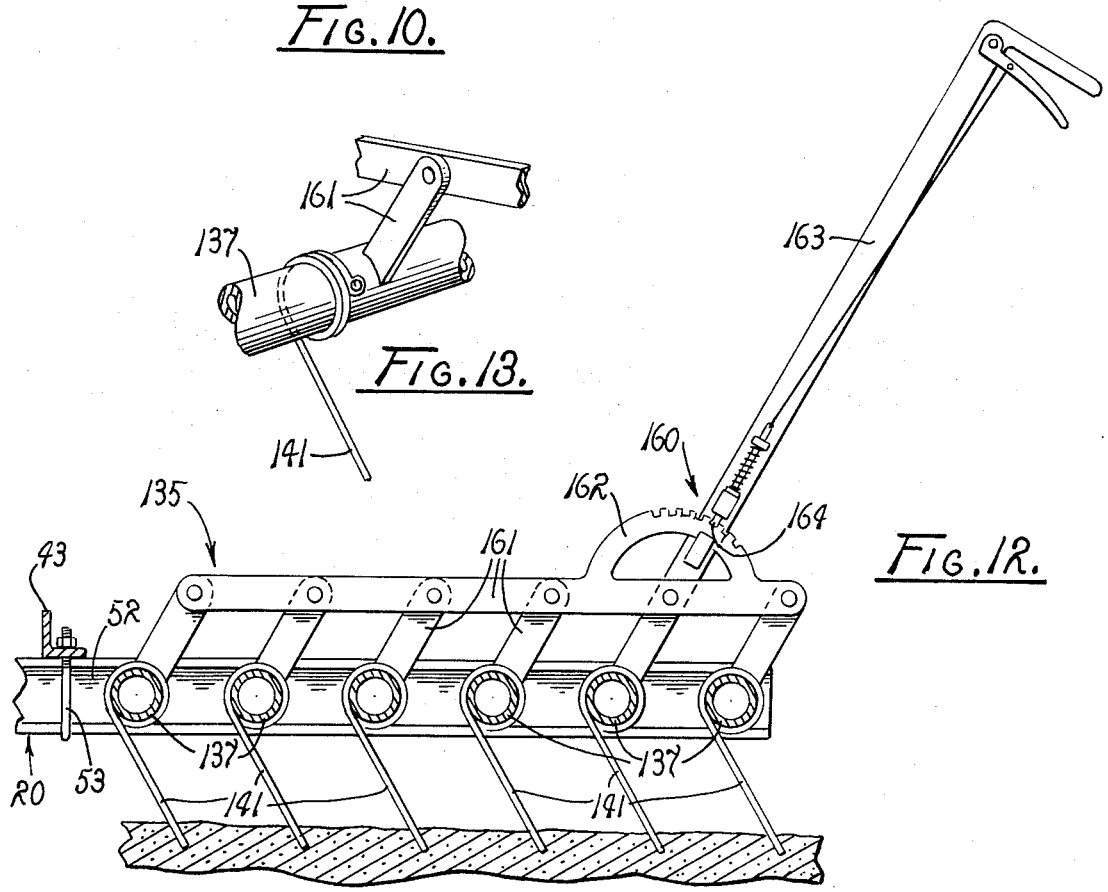

3,796,269

CULTIVATOR

BACKGROUND OF THE INVENTION

The present invention relates to a cultivator and more particularly to such a cultivator which facilitates the weeding and soil mulching of row crops so as to maintain such crops in the optimum growing condition.

A major problem in the raising of row crops such as sugar beets, cotton, and the like is the simultaneous growth of weeds in and adjacent to the rows. Such plant life competes with the crop for nutrients and water from the soil so as to limit crop growth. Consequently, it is the preferred practice in the raising of such crops to remove weeds and other undesirable plant growth in and adjacent to the rows particularly during the most rapid periods of crop growth.

The most effective method for removing such unwanted plant growth has been by manual labor. Crews of laborers have been sent through the fields selectively to remove weeds adjacent to the plants without damaging the plants. However, as the expense of such manual weeding operations has increased, it has become common practice to utilize cultivators of a variety of types to accomplish such weeding. All such cultivators in the past have suffered from common failings. They have not removed nearly all of the detrimental plant growth. They frequently have damaged the crop plants by abrading or uprooting the plants or by damaging the fruit growing on the plants. Furthermore, such mechanical cultivators have not been readily adjustable so as to permit weeding on a periodic basis to accommodate crop growth.

Therefore, it has long been recognized as desirable to provide an improved cultivator which is fully adjustable to weed a variety of types and sizes of row crops, to remove a substantially greater percentage of weed growth throughout the growing season than conventionally attainable, and to do so while minimizing injury to the crops.

SUMMARY OF THE INVENTION

It is therefore an object of the present invention to provide a cultivator which facilitates the weeding of row crops from planting through maturity.

Another object is to provide such a cultivator which is readily adjustable for the weeding of a wide variety of types and sizes of row crops.

Another object is to provide such a cultivator which weeds both adjacent to and in the row crop during passage thereover.

Another object is to provide such a cultivator which simultaneously weeds several crop rows in one passage.

Another object is to provide such a cultivator which is readily adjustable for the weeding of a row crop on a periodic basis as the crop grows so as to maintain the rows in a clean condition from planting through maturity.

Another object is to provide such a cultivator which has a variety of earthworking elements which are individually adjustable so as to provide maximum adaptability to permit controlled cultivation of the row crop.

A further object is to provide such a cultivator which is conveniently attachable to a conventional agricultural means of conveyance.

A still further object is to provide such a cultivator which has support and guide means to facilitate earth traversing movement over several crop rows achieving partial ground support in the furrows between the rows.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 1 is a top plan view of the cultivator of the present invention showing it mounted on a tractor for earth traversing movement over several crop rows.

FIG. 2 is a fragmentary, transverse vertical section taken on line 2—2 of FIG. 1.

FIG. 3 is a longitudinal vertical section taken on line 3—3 of FIG. 1.

FIG. 6 is a somewhat enlarged, fragmentary top plan view of a station in a cultivating unit having rotary cultivating wheels mounted therein.

FIG. 7 is a longitudinal vertical section taken on line 7—7 of FIG. 6.

FIG. 8 is a somewhat enlarged, fragmentary side elevation of a rotary cultivating wheel.

FIG. 9 is a somewhat further enlarged, fragmentary side elevation of a portion of a cultivating wheel showing the mounting for a spring tooth.

FIG. 10 is a somewhat enlarged, fragmentary vertical section of a harrow taken on line 10—10 of FIG. 1.

FIG. 11 is a somewhat further enlarged, fragmentary perspective view of a portion of the adjustment mechanism of the harrow.

FIG. 12 is a somewhat enlarged, longitudinal vertical section taken on line 12—12 of FIG. 1.

FIG. 13 is a somewhat further enlarged, fragmentary perspective view of a portion of the adjustment mechanism of the harrow.

DESCRIPTION OF THE PREFERRED EMBODIMENT

Figure 4:
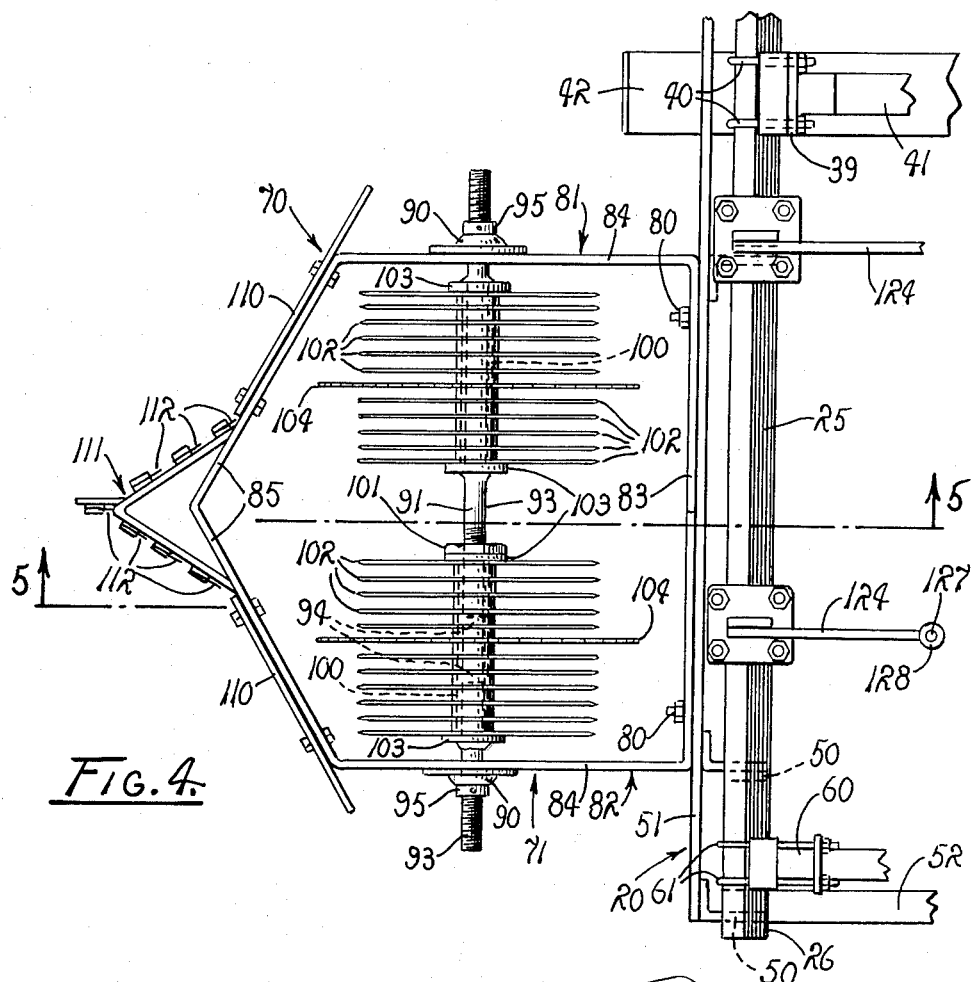
FIG. 4 is a somewhat enlarged fragmentary top plan view of a forward portion of a cultivating unit of the cultivator of the present invention.
Figure 5:
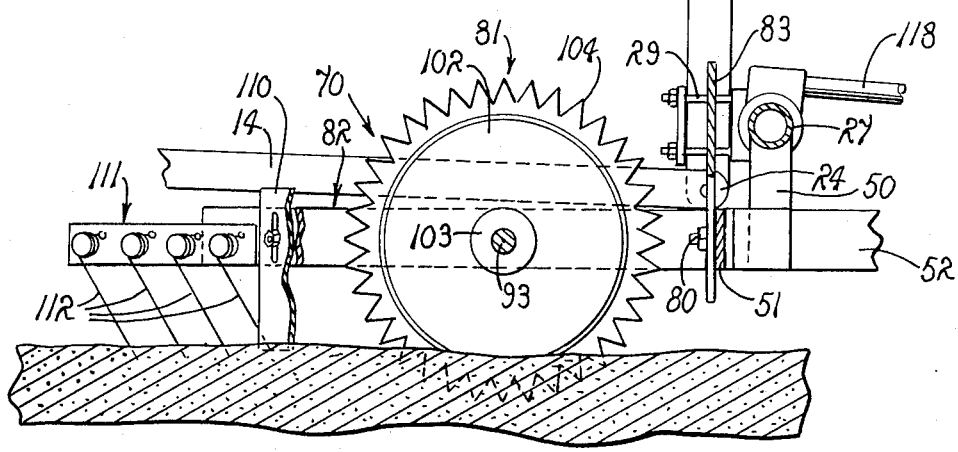
FIG. 5 is a fragmentary, longitudinal vertical section taken on line 5—5 of FIG. 4.

Referring more particulary to the drawings, FIG. 1 shows a cultivator of the present invention, generally indicated by the numeral 10. The cultivator is shown in FIG. 1 mounted for earth traversing movement behind a tractor 11 having rear wheels 12. The cultivator may be supported on the tractor by any suitable means but is shown in the drawings mounted on a conventional three-point hitch 13. The hitch consists essentially of three rearwardly extending pivot arms 14 with a pair of conventional power arms 15 operably interconnecting the tractor and two of the pivot arms for lifting the cultivator.

The cultivator 10 has a rigid metal sled frame 20. The frame has a vertical central support member 21 which is connected to the distal end of the central pivot arm 14 by a pivotal mount 22. The frame further provides a pair of vertically standing lateral support members 23 disposed in spaced parallel relation to the central support member mounted at the distal ends of the outlying pivot arms by a pivotal mount 24. A tool bar 25 having opposite ends 26 horizontally interconnects the central and lateral support members and oppositely laterally extends beyond the lateral support members, as best shown in FIG. 1. As is well known, the tool bar 25 is transversely of square configuration and for convenience is subsequently referred to as the "angular" tool bar. A tubular tool bar 27 having opposite ends 28 horizontally interconnects the central and lateral support members in spaced parallel relation to the angular tool bar at a position therebelow and extends laterally beyond the lateral support members, as best shown in FIG. 2. The tool bars 25 and 27 are mounted on the support members 21 and 23 by vertically adjustable U-clamps 29.

Figure 14:
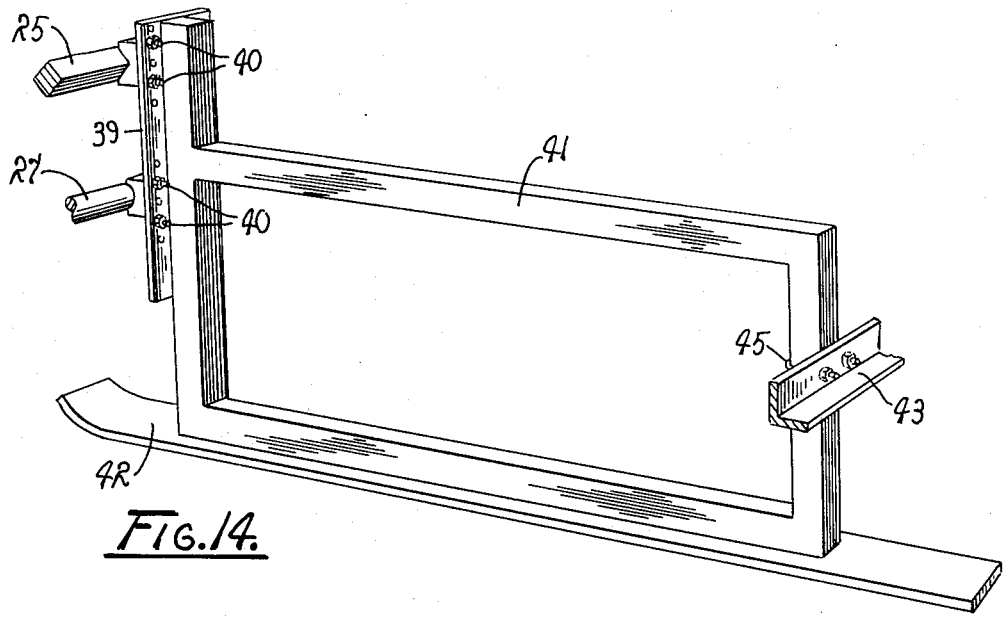
FIG. 14 is a fragmentary perspective view of a runner of the cultivator.

Outwardly of the lateral support members 23 on the tool bars 25 and 27 are individually provided a pair of runner mounts 39 secured in position by U-clamps 40, as best shown in FIGS. 2 and 14. An angular runner frame 41 is secured, as by welding, to each of the runner mounts and extends rearwardly therefrom. Each runner frame has a runner 42 secured thereon, also as by welding, and is adapted for sliding ground engagement. An angle iron 43, having opposite ends 44, interconnects the runner frames rearwardly thereof in spaced parallel relation to the tool bars 25 and 27, as best shown in FIGS. 1 and 6. The angle iron is mounted in position on the runner frames by U-clamps 45.

Figure 15:
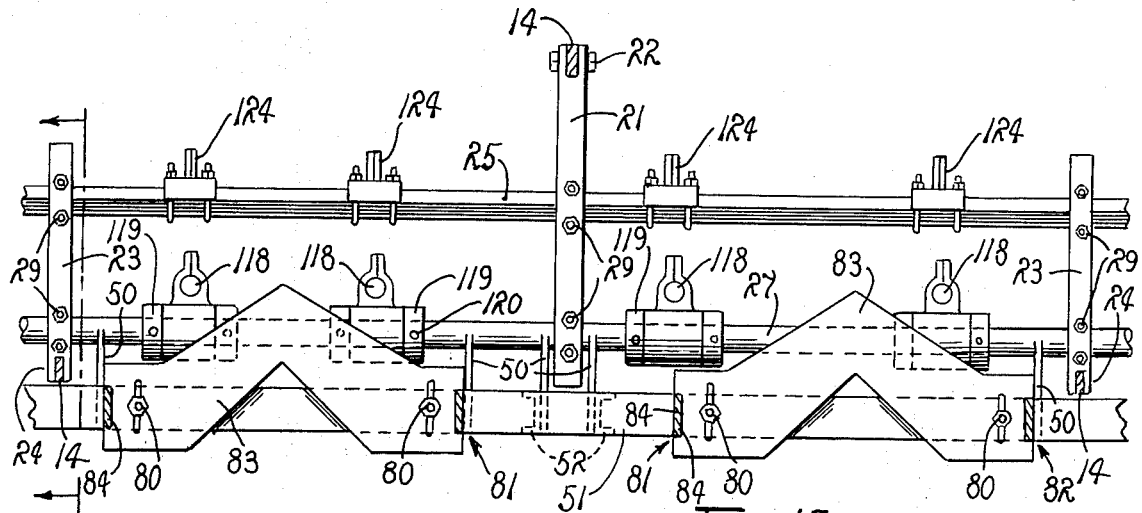
FIG. 15 is a somewhat enlarged, fragmentary transverse vertical section taken on line 15—15 of FIG. 1.
Figure 16:
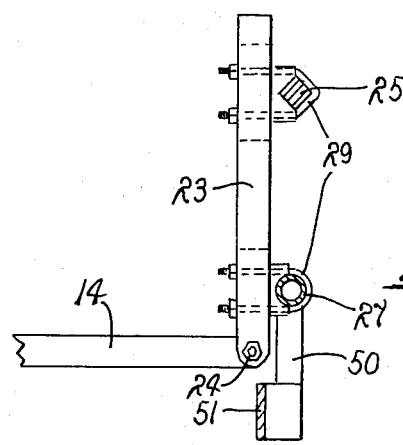
FIG. 16 is a longitudinal vertical section taken on line 16—16 of FIG. 15.

Twelve mounting brackets 50 are mounted on the tool bar 27, as by welding, and extend downwardly therefrom. The brackets are secured in spaced relation in two groups of six on opposite sides of support member 21, as best shown in FIG. 2. A pair of mounting bars 51 are individually secured on the downwardly extending ends of the mounting brackets on opposite sides of the support member and extending between the opposite ends 28 of the tool bar 27 and the support member 21, as best shown in FIGS. 1, 2 and 15. Four channel bars 52 are weldably mounted on the downwardly extending ends of the mounting brackets adjacent to the opposite ends 28 and the support member 21 and extend rearwardly in spaced parallel relation therefrom, as best shown in FIG. 1. The channel bars are secured to angle iron 43 by U-clamps 53.

A guide wheel assembly 60 is mounted on the opposite ends 26 and 28 of the tool bars 25 and 27 by U-clamps 61, as best shown in FIGS. 1 and 2. Each guide wheel assembly is provided with a frustum shaped guide wheel 62 facing inwardly and adapted for rotational ground engagement about an axis transverse to the direction of travel.

Four cultivating units 70 are mounted in the sled frame 20 in parallel side-by-side relation. Two of the cultivating units are provided in the frame inwardly of the runners 42 and two cultivating units are individually provided outwardly of the runners adjacent to the opposite ends 28 of tool bar 27, as best shown in FIG. 1. The sled frame divides each of the cultivating units into work stations. A forward work station 71 is provided between the tractor 11 and tool bars 25 and 27. A central work station 72 is provided between the tool bars and the angle iron 43. A rearward work station 73 is provided rearwardly of the angle iron.

A pair of studs 80 extend forwardly from the mounting bar 51 in the forward work station of each cultivating unit 70. A disk assembly 81 is mounted on the studs as best shown in FIG. 4. Each disk assembly includes a disk frame 82 which is mounted and vertically adjustable on the studs. Each disk frame has an arched plate 83, opposite sides 84, and a V-shaped forward portion 85.

A pair of bearings 90 are individually mounted in the sides 84 of each disk frame 82 defining an axis parallel to the tool bars 25 and 27. A shaft 91 having threaded portions 92 adjacent to its distal ends is rotationally received in the bearings. The shaft has two segments 93 defining a gap 94 which is near one of the sides 84 of the disk frame, as best shown in FIG. 4. A pair of collars 95 are individually received on the opposite threaded portions of the shaft to retain the shaft in rotational position in each disk frame.

A pair of sleeves 100 are received about the shaft 91 adjacent the sides 84 of each disk frame 82, one sleeve being in covering relation to the gap 94 of the shaft, as best shown in FIG. 4. The sleeve in covering relation to the gap is weldably secured to the segment 93 of the shaft adjacent to the opposite side of the disk frame and adjustably fastened by a nut 101 to the other segment of the shaft so as to rotate with the shaft. The other sleeve is weldably secured at both of its ends to the shaft so as also to rotate with the shaft. A plurality of flat disk blades 102 are mounted in spaced relation on each of the sleeves and releasably held in fixed position thereon by lock collars 103 received about the opposite ends of the sleeves. A toothed drive disk 104 is mounted in fixed relation about each of the sleeves and is preferably of a greater diameter than the disk blades for driving ground engagement.

A pair of sweeps or wings 110 are mounted on the V-shaped forward portion 85 of each disk frame 82 and are adjustable both vertically and horizontally. A V-shaped raking member 111 having ground engaging spring teeth 112 extending therebelow is mounted on the V-shaped forward portion of each disk frame and extends forwardly therefrom, as best shown in FIG. 4.

A pair of wheel pivot arms 118 are pivotally mounted on the tubular tool bar 27 in the central work station 72 of each cultivating unit 70. Each pivot arm is maintained in pivotal position on the tool bar by a pair of stop collars 119 secured in position on the bar by screws 120, as best shown in FIG. 2. The pivot arms extend rearwardly from tool bar 27 in each central work station and are of different lengths, as best shown in FIG. 6. The pivot arms have mounting assemblies 121 at the distal ends thereof extending substantially normal to the arms, also as best shown in FIG. 6. A pair of cultivating wheels 122 are individually mounted on the pivot arms oblique to the direction of travel and divergent with respect to each other within their respective work station. Each cultivating wheel has a plurality of spring teeth 123 disposed about its periphery and extended radially therefrom for ground engagement.

A pair of spring arms 124 having guide rings 125 at the distal ends thereof are mounted by U-clamps 126 on the angular tool bar 25 in each central work station individually above and in vertical alignment with the pivot arms 118. The spring arms are somewhat shorter than their corresponding pivot arms. A pair of rods 127 are individually, pivotally connected to the pivot arms of each cultivating unit 70 adjacent to the mounting assemblies 121 and extend upwardly through the guide rings of the spring arms. A pair of collars 128 are adjustably positionable on each of the rods in spaced relation on opposite sides of the guide ring, as best shown in FIG. 7. A pair of compression springs 129 are positioned about the rod between the guide ring and each of the collars. Each of the cultivating wheels is thus adjustably suspended for tensioned ground engagement.

Spring tooth harrows 135 are provided in the rearward work station 73 of adjacent pairs of cultivating units 70 on opposite sides of the sled frame 20, as best shown in FIG. 1. Each harrow extends in the rearward work station between adjacent channel bars 52 of the frame. Each harrow includes a plurality of bearings 136 mounted in aligned relation in the rearward work station on the channel bars 52 rearwardly of the angle iron 43. A plurality of tool bars 137 are rotationally received in parallel relation in the bearings of each harrow. A pair of sleeves 138 are rotationally mounted on each of the tool bars in predetermined spaced relation in longitudinal alignment with the point of ground engagement of the cultivating wheels 122 of each cultivating unit. A pair of collars 139 are individually fastened on the tool bar 137 on opposite sides of each sleeve to retain the sleeve in position on the tool bar. Several spring teeth 140 are secured on each of the sleeves for ground engagement. A plurality of spring teeth 141 are fastened on the tool bars 137 on opposite sides of the sleeves 138 and also are adapted for ground engagement.

A lever assembly 150 is mounted in operable association with the aligned sleeves 138 in the rearward work station 73 of each cultivating unit 70, as best shown in FIGS. 1 and 10. Each lever assembly includes a linkage 151 individually connected to each sleeve and a ratchet 152 operably associated therewith. A lever arm 153 is mounted on the lever assembly and includes a spring pawl 154 which is operable selectively to engage the ratchet in the conventional manner, as best shown in FIG. 10. A second lever assembly 160 is mounted on each of the harrows 135 centrally of the tool bars 137, as best shown in FIGS. 1 and 12. The assembly 160 includes a linkage 161 individually connected to each of the tool bars of the harrow and having a ratchet 162 in operable association therewith. A lever arm 163 of a somewhat greater length than the lever arm 153 of lever assembly 150 is mounted on the linkage and provides a spring pawl 164 which is operable in the conventional manner selectively to engage the ratchet 162. It will be noted that the lever assemblies 150 and 160 are operable individually to position the spring teeth 140 and 141.

OPERATION

The operation of the described embodiment of the subject invention is believed to be clearly apparent and is briefly summarized at this point. The cultivator 10 is designed for the simultaneous cultivation of four crop rows 170, separated in the conventional arrangement by furrows 171 and including individual plants 172. It will be seen that the cultivator is adjustable for the performance of cultivating operations in row crops through the full growth cycle. This includes, if desired, the period immediately after planting and before the plants have broken through the soil.

The cultivator 10 is mounted on the three-point hitch 13 of the tractor 11, as shown in FIGS. 1 and 3. The dirt wings 110 of each cultivating unit 70 are adjustable both vertically and horizontally. Each of the disk assemblies 81 is vertically adjustable on the studs 80 thereby permitting adjustment of the elevation of the disk blades 102 and the raking member 111. The sleeves 100 and their associated disk blades are adjustable toward or away from each other as permitted by the gap 94 between the segments 93. To adjust the sleeves, the nut 101 and the collars 95 are loosened to permit the segments of the shaft 91, and consequently the attached sleeves, to be repositioned with respect to each other and centered within the disk frame 82. Tightening of the nut and collars thereafter firmly secures the sleeves and associated disk blades in the readjusted positions.

Adjustment of the collars 128 of each rod 127 permits tensioned vertical repositioning of each cultivating wheel 122, as best shown in FIG. 7. Adjustment of the lever assemblies 150 and 160 utilizing lever arms 153 and 163, respectively, permits individual adjustment of the depth of penetration of the spring teeth 140 and 141 of each spring tooth harrow 135. Adjustment of the depth of penetration of the raking member 111, the cultivating wheels, and the spring teeth 140 is regulated in accordance with the size of the plants 172 of each crop row 170 since these elements cultivate in the row itself. The depth of penetration selected for the disk blades 102 and the spring teeth 141 can be greater than the above elements since they cultivate immediately adjacent to the crop rows rather than in the rows themselves.

After such selected adjustment of the cultivator 10, the tractor 11 is operated to raise the power arms 15 and associated pivot arms 14 so as to lift the cultivator out of ground engagement for movement to the area desired to be cultivated. The tractor is then operated to carry the cultivator to a position in which the runners 42 and guide wheels 62 are positioned directly above the furrows 171 between the crop rows 170. With the cultivator so positioned, the raking member 111, the cultivating wheels 122, and the spring teeth 140 of each cultivating unit 70 are in precise alignment with their respective crop row. The tractor is then operated to lower the cultivator so that the runners and guide wheels are in ground engagement, as shown in FIG. 2.

The tractor 11 is operated in the conventional manner to draw the cultivator 10 in earth traversing movement along the crop rows 170, as best shown in FIG. 1. During such earth traversing movement, the spring teeth 112 of the raking member 111 of each cultivating unit 70 operate to sweep dirt clods, rocks, and other debris from the crop row and outwardly against the dirt wings 110. The wings subsequently transfer this unwanted material into the furrows 171. The drive disk 104 of each set of disk blades 102 engages the ground and motivates the disk blades to slice and loosen the soil immediately adjacent to and on opposite sides of each crop row. The cultivating wheels 122 engage the ground in each crop row to cultivate unwanted plant growth therefrom. In the conventional manner, the diagonal positioning of each cultivating wheel and the engagement of its spring teeth 123 with the ground causes the cultivating wheels to be rotated as earth traversing movement is continued. Such rotation causes the unwanted plant growth to be raked from the crop row into the furrows on the opposite sides of each crop row.

The spring teeth 140 of the sleeves 138 are drawn through each crop row 170 and operate further to cultivate the soil between the plants 172. Controlled adjustment of the lever assembly 150 permits the spring teeth 140 to be drawn out of ground engagement and, if need be, fully retracted so as to avoid any contact with the plants in the crop row in order to avoid damage thereto. The spring teeth 141 of the tool bars 137 are independently adjustable by lever assembly 160 to position the spring teeth in engagement with the soil on opposite sides of the crop row so as further to loosen and smooth the soil. The frustum shape of the guide wheels 62 and the positioning of the runners 42 insures that the cultivator 10 is easy to direct along the crop rows and can easily be maintained in the precise attitude for optimum cultivating of the crop rows.

As the row crop grows and becomes taller, and in order to allow cultivation of a variety of types of row crops, the cultivator 10 is fully adjustable as described in order to permit the optimum type and depth of cultivation in and immediately adjacent to each crop row 170. Furthermore, the utilization of four individual cultivating units 70 permits one tractor to cultivate four crop rows simultaneously. Finally, it will be seen that since the cultivating units are substantially separate and distinct, it is possible to adjust the cultivating units separately. This allows simultaneous cultivation of alternating rows of different row crops or of row crops of different stages of development. Therefore, the cultivator of the present invention is fully adjustable to weed and cultivate a variety of types and sizes of row crops to remove a substantially greater percentage of unwanted plant growth than has heretofore been possible throughout the growing season while minimizing injury to the crop.

The utility of the present invention may be specifically exemplified by reference to the growing of cotton. When the cotton seed is planted, it is the practice somewhat to ridge the row to keep the seed from drying out and to cause the row to shed water. As soon as the seed has germinated, usually in four or five days, the tool of the present invention is utilized to mulch the soil along the row and between plants in the row to minimize crusting, to minimize weed germination and growth and to reduce evaporation. The tool is used at frequent intervals, as needed.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A cultivator, adapted for cultivation along a plurality of crop rows comprising a tool bar supported for earth traversing movement in a predetermined direction of travel; a plurality of cultivating units mounted on the tool bar, each unit having a forwardly disposed mounting shaft mounted on the tool bar; a plurality of disk blades adjustably positionable on each shaft for cultivation on opposite sides of each crop row, each unit having rearwardly disposed mounting arms mounted on the tool bar; a cultivating wheel rotatably mounted on each arm oblique to the direction of travel and adapted for cultivating ground engagement in the crop row between the paths of travel of the disk blades positioned on opposite sides of the crop row; and side directional sweeping means extended from the tool bar forwardly of the disk blades, said sweeping means including ground engaging raking teeth.

* * * * *

UNITED STATES PATENT OFFICE
CERTIFICATE OF CORRECTION

Patent No. 3,796,269            Dated March 12, 1974

Inventor(s)     James J. Carlucci

It is certified that error appears in the above-identified patent and that said Letters Patent are hereby corrected as shown below:

Column 5, line 17, after "work" and before "73"

delete "station" and insert ---stations---.

Signed and sealed this 18th day of June 1974.

(SEAL)
Attest:

EDWARD M. FLETCHER, JR.        C. MARSHALL DANN
Attesting Officer                Commissioner of Patents